US006521700B1

(12) United States Patent
Dworak et al.

(10) Patent No.: US 6,521,700 B1
(45) Date of Patent: Feb. 18, 2003

(54) AQUEOUS COATING COMPOSITION

(75) Inventors: Gert Dworak, Graz (AT); Wrner Staritzbichler, Graz (AT)

(73) Assignee: Solutia Austria GmbH, Werndorf (AT)

( * ) Notice: Subject to any disclaimer, the term of this patent is extended or adjusted under 35 U.S.C. 154(b) by 108 days.

(21) Appl. No.: 09/723,887

(22) Filed: Nov. 28, 2000

(30) Foreign Application Priority Data

Dec. 23, 1999 (AT) ............................................... 2172/99

(51) Int. Cl.7 ............................................... C08L 75/00
(52) U.S. Cl. ...................... 524/589; 524/598; 524/800; 524/601; 524/602
(58) Field of Search ................................ 524/589, 599, 524/600, 601, 602

(56) References Cited

U.S. PATENT DOCUMENTS

| 4,284,544 | A |   | 8/1981  | Wegner et al. |
| 4,659,753 | A | * | 4/1987  | Tiburtius ............ 523/209 |
| 4,968,536 | A |   | 11/1990 | Goldner et al. |
| 5,210,154 | A |   | 5/1993  | Weidemeier et al. |
| 5,294,665 | A |   | 3/1994  | Pedain et al. |
| 5,387,267 | A |   | 2/1995  | Haeberle et al. |
| 5,455,297 | A |   | 10/1995 | Pedian et al. |
| 5,494,956 | A |   | 2/1996  | Dworak et al. |
| 5,521,247 | A |   | 5/1996  | Dobler et al. |
| 5,977,247 | A |   | 11/1999 | Schafheutle et al. |

FOREIGN PATENT DOCUMENTS

| CA | 2033530     | 7/1991  |
| DE | A 38 05 629 | 5/1989  |
| DE | A 38 13 866 | 11/1989 |
| DE | A 39 18510  | 12/1990 |
| DE | A 44 13 059 | 1/1996  |
| EP | 0 012 348   | 6/1980  |
| EP | A 0 249 727 | 12/1987 |
| EP | 0 424 697   | 5/1991  |
| EP | A 486 881   | 5/1992  |
| EP | A 0 548 873 | 6/1993  |
| EP | 0 566 953   | 10/1993 |
| EP | 0 524 511   | 11/1993 |
| EP | 0 576 952   | 1/1994  |
| EP | A 0 594 685 | 5/1994  |
| EP | 0 942 023 A1| 9/1999  |
| GB | A 1475348   | 6/1977  |

* cited by examiner

Primary Examiner—Edward J. Cain
(74) Attorney, Agent, or Firm—ProPat, L.L.C.

(57) ABSTRACT

Coating composition especially for preparing automotive surfacers, comprising a condensation product A of a carboxyl group-containing resin A1 and a hydroxyl group-containing resin A2, and a curing agent C, which becomes active only at elevated temperature of at least 80° C., and comprises a mixture of a water-insoluble blocked isocyanate C1 and a hydrophilically modified isocyanate C2.

10 Claims, No Drawings

AQUEOUS COATING COMPOSITION

BACKGROUND OF THE INVENTION

1. Field of the Invention

The invention relates to an aqueous coating composition suitable in particular for producing coatings on automobile parts. The parts thus coated, especially those where the coating composition described here is used as surfacer coat, are notable for high stone-chip resistance.

2. Description of the Related Art

DE-A 39 18 510 relates to conventional baking surfacers based on blocked isocyanates and polyesters (in solution in organic solvents). There was a need to produce equivalent coatings using aqueous systems.

EP-A 0 249 727 relates to aqueous surfacer coating compositions based on phosphoric-acid-modified epoxy resins, water-dilutable polyesters as known from AT-B 328 587, and water-dilutable melamine resins.

DE-A 40 00 748 relates to aqueous surfacer coating compositions comprising water-dilutable hydroxyl group-containing polyurethane resins, which may if desired include other, admixed binders, and aqueous amine resins as curing agents.

Mixtures of water-dilutable polyurethane resins, of water-dilutable polyesters modified with epoxy resin, and, if desired, water-dilutable amino resins are known from DE-A 38 13 866.

Other aqueous surfacer coating compositions based on carboxyl group-containing polyesters or acrylic copolymers and water-soluble blocked isocyanate prepolymers, alone or in combination with water-dilutable amine resins, are described in DE-A 38 05 629.

EP-A 0 594 685 relates to the use of condensation products of carboxyl group-containing polyurethane resins and hydroxyl group-containing polyester resins, with or without urethane modification, together with water-insoluble blocked isocyanates for producing stoving enamels. An improvement of this formulation with reduced sensitivity to so-called overbaking is known from EP-A 0 548 873, the improvement being achieved by adding a water-soluble amine resin as crosslinker.

All of these known systems are still in need of improvement especially in respect of gloss and stone-chip resistance (especially at low temperatures).

SUMMARY OF THE INVENTION

It has now been found that by using a combination of water-insoluble blocked isocyanates and water-soluble or water-dispersible (referred to below together as "hydrophilic" or "hydrophilicized") blocked isocyanates together with condensation products of hydroxyl group-containing and carboxyl group-containing resins it is possible to obtain coating compositions which compared with the known systems exhibit better gloss after baking and improved stone-chip resistance even at low temperatures.

The invention accordingly provides a coating composition comprising a condensation product A of a carboxyl group-containing resin A1 and a hydroxyl group-containing resin A2, A2 preferably having an acid number of from 100 to 230 mg/g, in particular from 120 to 160 mg/g, and A2 preferably having a hydroxyl number of from 50 to 500 mg/g, in particular from 60 to 350 mg/g, a curing agent C which becomes active only at an elevated temperature of at least 80° C. and comprises a water-insoluble blocked isocyanate C1 and a hydrophilic blocked isocyanate C2, with the proviso that at least 20% of the mass of the curing agent C is insoluble in water.

"Water-insoluble" is a term used to refer to those compounds for which, following the achievement of equilibrium at 20° C. with an amount of water the mass of which is ten times that of the compound in question, less than 5% of the mass of the compound that is used is present in solution in the aqueous phase. The terms water-soluble or water-dispersible are used to refer to those blocked isocyanates for which, following achievement of equilibrium at 20° C. with an amount of water the mass of which is ten times that of the compound in question, less than 5% of the mass of the said compound used is not present in solution or dispersion in the aqueous phase.

The acid number is defined in accordance with DIN 53 402 as the ratio of the mass $m_{KOH}$ of potassium hydroxide required to neutralize the sample under analysis to the mass $m_B$ of this sample (mass of the solids in the sample in the case of solutions or dispersions); its customary unit is "mg/g". The hydroxyl number is defined in accordance with DIN 53 240 as the ratio of that mass $m_{KOH}$ of potassium hydroxide which has exactly the same number of hydroxyl groups as the sample under analysis to the mass $m_B$ of this sample (mass of the solids in the sample in the case of solutions or dispersions); its customary unit is "mg/g".

The formerly so-called "limiting viscosity number", called "Staudinger Index" $J_g$ in accordance with DIN 1342, Part 2.4, is the limiting value of the Staudinger function $J_v$ at decreasing concentration and shear stress, $J_v$ being the relative change in viscosity based on the mass concentration $\beta_B = m_B/V$ of the dissolved substance B (with the mass $m_B$ of the substance in the volume V of the solution); i.e., $J_v = (\eta_r - 1)/\beta_B$. Here, $\eta_r - 1$ is the relative change in viscosity, in accordance with $\eta_r - 1 = (\eta - \eta_s)/\eta_s$. The relative viscosity $\eta_r$ is the ratio of the viscosity $\eta$ of the solution under analysis and the viscosity $\eta_s$ of the pure solvent. (The physical meaning of the Staudinger Index is that of a specific hydrodynamic volume of the solvated polymer coil at infinite dilution and in the state of rest.) The unit commonly used for J is "$cm^3/g$"; formerly often "dl/g".

Further objects, features and advantages of the invention will become apparent from the detailed description of the preferred embodiments that follows.

DETAILED DESCRIPTION OF THE PREFERRED EMBODIMENTS

The condensation product A preferably has an acid number of from 25 to 75 mg/g, in particular from 30 to 50 mg/g. Its Staudinger Index ("limiting viscosity number") is usually from 10 to 20 $cm^3/g$, in particular from 12 to 19 $cm^3/g$, and with particular preference from 13 to 18 $cm^3/g$. It is prepared using components A1 and A2 preferably in a mass ratio of from 10:90 to 80:20, in particular from 15:85 to 40:60.

The resins A1 containing carboxyl groups are preferably selected from polyester resins A11, polyurethane resins A12, the so-called maleate oils A13, fatty acids and fatty acid mixtures grafted with unsaturated carboxylic acids A14, and the acrylate resins A15. Preferably, the acid number of the resins A1 is from 100 to 230 mg/g, in particular from 70 to 160 mg/g. Its Staudinger Index, measured in dimethylformamide as solvent at 20° C., is generally from about 4.0 to 12 $cm^3/g$, preferably from 7 to 11 $cm^3/g$.

Suitable polyester resins A11 may be prepared in a conventional manner from polyols A111 and polycarboxylic acids A112, it being possible for some—preferably up to 25%—of the amount of, substance of the polyols and polycarboxylic acids to be replaced by hydroxycarboxylic acids A113. By appropriate choice of the nature and amount of the starting materials A111 and A112 it is ensured that the resulting polyester has a sufficient number of acid groups, in accordance with the acid number indicated above. The polyols A111 are preferably selected from aliphatic and cycloaliphatic alcohols having 2 to 10 carbon atoms and on average at least two hydroxyl groups per molecule; glycol, 1,2- and 1,3-propanediol, 1,4-butanediol, 1,6-hexanediol, neopentyl glycol, di- and triethylene glycol, di- and tripropylene glycol, glycerol, trimethylol propane and trimethylol ethane are particularly suitable. Suitable polycarboxylic acids A112 are aliphatic, cycloaliphatic and aromatic polycarboxylic acids such as adipic acid, succinic acid, cyclohexanedicarboxylic acid, phthalic acid, isophthalic and terephthalic acids, trimellitic acid and trimesic acid, and benzophenonetetracarboxylic acid. It is also possible to use compounds having both carboxylic acid groups and sulfonic acid groups, such as sulfoisophthalic acid, for example.

Suitable polyurethane resins A12 may be prepared by reacting aliphatic polyols A121, as defined under A111, hydroxyalkane carboxylic acids A122 having at least one, preferably two, hydroxyl groups and a carboxyl group which under esterification conditions is less reactive than adipic acid; preference is given to the use of di-hydroxymonocarboxylic acids selected from dimethylolacetic acid, dimethylolbutyric acid and dimethylolpropionic acid; oligomeric or polymeric compounds A125 having on average at least two hydroxyl groups per molecule, which may be selected from polyether polyols A1251, polyester polyols A1252, polycarbonate polyols 1253, saturated and unsaturated dihydroxyaliphatic compounds A1254, which are obtainable by oligomerizing or polymerizing dienes having 4 to 12 carbon atoms, especially butadiene, isoprene and dimethylbutadiene, followed by functionalization in a known manner, and also polyfunctional isocyanates A123, selected preferably from aromatic, cycloaliphatic and also linear and branched aliphatic difunctional isocyanates such as tolylene diisocyanate, bis(4-isocyanatophenyl)methane, tetramethylxylylene diisocyanate, isophorone diisocyanate, bis(4-isocyanatocyclohexyl)methane, hexamethylene diisocyanate and 1,6-diisocyanato-3,3,5- and -3,5,5-trimethylhexane.

Particular preference is given to those polyurethane resins A12 which are prepared by reacting a mixture of one or more polyols A121 with a hydroxyalkanecarboxylic acid A122 and at least one polyfunctional isocyanate A123 which has been at least partly blocked, usually to the extent of more than 20%, preferably to the extent of more than 35% and, in particular, to the extent of 50% or more with monohydroxy compounds A124 selected from polyalkylene glycol monoalkyl ethers HO—$(R^1$—O$)_n$—$R^2$ where $R^1$ is a linear or branchedalkylene radical having 2 to 6, preferably 2 to 4 carbon atoms and $R^2$ is an alkyl group of from 1 to 8, preferably 2 to 6 carbon atoms and oximes of aliphatic ketones having 3 to 9 carbon atoms. The degree of blocking is stated here as the fraction of the blocked isocyanate groups, based on the total isocyanate groups present (blocked and unblocked) in the isocyanate A123. It is further preferred to prepare the polyurethane resins A21 by reacting a mixture of a polyfunctional isocyanate and a polyfunctional isocyanate blocked as described above with the hydroxyalkanecarboxylic acid A122 and the polyols A121 and A125, the mixing proportions being chosen so that each molecule of the polyurethane A21 contains on average one or more than one terminal blocked isocyanate group.

"Maleate oil" A13 is a term used to denote reaction products of (drying) oils A131 and olefinically unsaturated carboxylic acids A132, especially dicarboxylic acids. Oils used as A131 are preferably drying and semidrying oils such as linseed oil, tallow oil, rapeseed oil, sunflower oil and cottonseed oil, having iodine numbers of from about 100 to about 180. The unsaturated carboxylic acids A132 are selected so that under the customary conditions they graft under free radical conditions (following addition of initiators or following heating) onto the initial charge of oils with a yield (fraction of the unsaturated carboxylic acids bonded to the oil after reaction, based on the amount used for the reaction) of more than 50%. Particularly suitable is maleic acid in the form of its anhydride, as are tetrahydrophthalic anhydride, acrylic and methacrylic acid, and also citraconic, mesaconic and itaconic acid.

Other suitable resins A14 are the graft products of fatty acids or fatty acid mixtures A141 grafted with the unsaturated acids specified under A132, said fatty acids or fatty acid mixtures A141 being obtainable in industrial amounts by saponification of fats. The appropriate fatty acids have at least one olefinic double bond in the molecule; those which may be listed by way of example include oleic acid, linoleic and linolenic acid, ricinoleic acid and elaidic acid, and also the stated technical-grade mixtures of such acids.

Further suitable resins A15 are the acidic acrylate resins obtainable by copolymerization of olefinically unsaturated carboxylic acids A151 and other vinyl or acrylic monomers A152. The carboxylic acids are those already mentioned under A132, and also vinylacetic acid and crotonic and isocrotonic acid and the monoesters of olefinically unsaturated dicarboxylic acids, such as monomethyl maleate and monomethyl fumarate, for example. Suitable monomers A152 are the alkyl esters of acrylic and methacrylic acid having preferably from 1 to 8 carbon atoms in the alkyl group, (meth)acrylonitrile, hydroxyalykyl (meth)acrylates having 2 to 6 carbon atoms in the alkyl group, styrene, vinyltoluene, and vinyl esters of aliphatic linear and branched carboxylic acids having 2 to 15 carbon atoms, especially vinyl acetate and the vinyl ester of a mixture of branched aliphatic carboxylic acids having on average 9 to 11 carbon atoms. It is also advantageous to copolymerize the monomers specified under A151 and A152 in the presence of compounds A153 which react with the unsaturated carboxylic acids with addition and formation of a carboxyl- or hydroxyl-functional, copolymerizable compound. Examples of such compounds are lactones A1531, which react with the carboxylic acids A151 with ring opening to form a carboxyl-functional unsaturated compound, and epoxides A1532, especially glycidyl esters of α-branched saturated aliphatic acids having 5 to 12 carbon atoms, such as of neodecanoic acid or neopentanoic acid, which react with the acid A151 with addition to give a copolymerizable compound containing a hydroxyl group. The amounts of substance of the compounds used should be such that the required acid number is reached. If this compound A153 is introduced as the initial charge and the polymerization is conducted so that this compound is used as (sole) solvent, solvent-free acrylate resins are obtained.

Suitable hydroxyl group-containing resins A2 are, in particular, polyesters A21, acrylate resins A22, polyurethane resins A23, and epoxy resins A24. The hydroxyl number of the resins A2 is generally from about 50 to 500 mg/g, preferably from about 60 to 350 mg/g, and with particular preference from 70 to 300 mg/g. The Staudinger Index, measured at 20° C. in dimethylformamide as solvent, is preferably from 8 to 13 cm$^3$/g, in particular from 9.5 to 12 cm$^3$/g.

The polyesters A21 are prepared like the component A11 by polycondensation; in this case all that is necessary is to select the nature and amount of the starting materials such that there is an excess of hydroxyl groups over the acid groups to arrive at the hydroxyl number indicated above for the condensation product. This can be achieved by using, polyhydric alcohols containing on average at least two, preferably at least 2.1, hydroxyl groups per molecule, with dicarboxylic acids or with a mixture of poly- and monocarboxylic acids containing on average not more than two, preferably from 1.5 to 1.95, acid groups per molecule. Another possibility is to use a corresponding excess of hydroxyl components (polyols) A211 over the acids A212. The polyols A211 and the polyfunctional acids A212 which are reacted in the polycondensation reaction to give the hydroxyl group-containing polyesters A21 are selected from the same groups as the polyols A111 and the acids A112. Another possibility is to replace some of the polyols and acids by hydroxy acids in accordance with A113. The aim is for the acid number of component A2 not to exceed 20 mg/g and to be preferably below 18 mg/g. The acid number may be reduced, for example, by reacting the condensed polyester A21 with a small amount of monofunctional aliphatic alcohols A114 under esterification conditions. The amount of alcohols A114 is such that, although the acid number is reduced below the limit, the Staudinger Index does not fall beyond the stated lower limit. Examples of suitable aliphatic alcohols are n-hexanol, 2-ethylhexanol, isodecyl alcohol and tridecyl alcohol.

The hydroxyl group-containing acrylate resins A22 are obtainable by usually free-radically initiated copolymerization of hydroxyl group-containing acrylic monomers A221 with other vinyl or acrylic monomers A222 without such functionality. Examples of the monomers A221 are esters of acrylic and methacrylic acid with aliphatic polyols, especially diols having 2 to 10 carbon atoms, such as hydroxyethyl and hydroxypropyl (meth)acrylate. Examples of the monomers A222 are the alkyl esters of (meth)acrylic acid having 1 to 10 carbon atoms in the alkyl group such as methyl, ethyl, n-butyl and 2-ethylhexyl (meth)acrylate, (meth)acrylonitrile, styrene, vinyltoluene, vinyl esters of aliphatic monocarboxylic acids having 1 to 10 carbon atoms such as vinyl acetate and vinyl propionate. Preference is also given to those acrylate resins prepared not, as is usual, in solution but instead in a bulk polymerization in which the initial charge comprises a liquid cyclic compound (see above, A153) which acts as solvent during the polymerization reaction and which by means of ring opening forms a copolymerizable compound on reaction with one of the monomers used. Examples of such compounds are glycidyl esters of α-branched aliphatic monocarboxylic acids, especially the acids or acid mixtures available commercially as neopentanoic acid or neodecanoic acid, and also lactones such as ε-caprolactone or δ-valerolactone. If these glycidyl esters are used, then during the polymerization it is necessary to use comonomers containing acid groups, such as (meth)acrylic acid, in a fraction which is at least equimolar to the amount of substance of the epoxide groups. The lactones may be used, with ring opening, both with hydroxyl group-containing comonomers and with comonomers containing acid groups.

Hydroxyl group-containing polyurethane resins A23 are obtainable in a known manner by addition reaction of oligomer or polymeric polyols A231 selected from polyester polyols, polyether polyols, polycarbonate polyols and polyolefin polyols, and, if desired, low molar mass aliphatic diols or polyols A233 having 2 to 12 carbon atoms, such as ethylene glycol, 1,2- and 1,3-propylene glycol, 1,4-butanediol, 1,6-hexanediol, di- and triethylene and/or -propylene glycol, neopentyl glycol, trimethylolpropane, pentaerythritol, ditrimethylolpropane, and dipentaerythritol, and polyfunctional isocyanates A232, the latter being used in a substoichiometric amount such that the number of hydroxyl groups in the reaction mixture is greater than the number of isocyanate groups. Suitable polyols are, in particular, oligomeric and polymeric dihydroxy compounds having a number-average molar mass $M_n$ of from about 200 to 10,000 g/mol. By means of polyaddition with polyfunctional, especially difunctional, isocyanates, the molecules are enlarged up to the target value for the Staudinger index of at least 8 $cm^3$/g, preferably at least 9.5 $cm^3$/g.

Epoxy resins A24 obtainable by reacting epichlorohydrin with aliphatic or aromatic diols or polyols, especially bisphenol A, bisphenol F, resorcinol, novolaks or oligomeric polyoxyalkylene glycols having 2 to 4, preferably 3 carbon atoms in the alkylene group, have at least one hydroxyl group per epichlorohydrin molecule used. Instead of the reaction of epichlorohydrin with diols, it is also possible to prepare the appropriate epoxy resins by the so-called advancement reaction from diglycidyl ethers of diols (such as those mentioned above) or diglycidyl esters of dibasic organic acids with the stated diols. All known epoxy resins may be used here, provided they satisfy the condition for the hydroxyl number.

The curing agents C comprise a combination of water-insoluble blocked isocyanates C1 and hydrophilic blocked isocyanates C2. The mass fraction of component C1 is preferably from 20 to 90%, with particular preference from 25 to 70%, based on the overal mass of the curing agent. The mass fraction of the hydrophilic blocked isocyanate C2 is preferably from 10 to 80%, in particular from 15 to 45%.

The blocked isocyanates C1 are obtainable by reacting polyfunctional aromatic, aliphatic or mixed aromatic-aliphatic isocyanates with isocyanate-reactive monofunctional compounds which are referred to as blocking agents, these reaction products being cleaved back into their starting components, isocyanate and blocking agent, at an elevated temperature, i.e., above 120° C., preferably even above 100° C., and in certain cases even from 80° C. During the curing process, the blocking agent is liberated and is able to escape from the as yet incompletely cured paint film. Preference is given to blocked isocyanates obtainable in a conventional manner from diisocyanates such as tolylene diisocyanate, isophorone diisocyanate, bis(4-isocyanatophenyl)methane, 1,6-diisocyanatohexane, tetramethylxylylene diisocyanate and also the allophanates, biurets or uretdiones formed from these diisocyanates, and customary blocking agents. These are, for example, linear or branched aliphatic alcohols with 3 to 20 carbon atoms, preferably 2-ethylhexanol; phenols such as phenol itself; glycol monoesters, the glycols being monomeric or oligomeric alkylene glycols such as glycol itself, 1,2- and 1,3-propanediol, 1,4-butanediol, di- and triethylene glycol, di- and tripropylene glycol, and the acid being selected from aliphatic monocarboxylic acids having 1 to 10 carbon atoms, preferably acetic acid; glycol monoethers, the glycols corresponding to those mentioned above and the etherifying component being selected from aliphatic lower alcohols having 1 to 8 carbon atoms, preferably butyl glycol; or ketoximes of aliphatic ketones with 3 to 10 carbon atoms, such as butanone oxime, for example. Particular preference is given to using 3,5-dimethylpyrazole as blocking agent, since it is not toxic and does not yellow even at temperatures of 180° C. or more. The blocking agents are customarily chosen such that the elimination temperature is between 80 and 180° C. Blocked isocyanates based on isophorone diisocyanate and 1,6-diisocyanatohexane are particularly preferred.

The hydrophilic blocked isocyanates C2 which may be used in minor amounts are known, inter alia, from the following documents:

EP-A 0 424 697 relates to hydrophilic blocked isocyanates obtainable by reacting a carboxyl group-containing polyether polyol, a diisocyanate, and a blocking agent. These isocyanates are used to impregnate fibers and for subsequent production of sheetlike structures therefrom.

EP-A 0 524 511 relates to a process for preparing aqueous dispersions of blocked isocyanates by reacting blocking agents in an aqueous dispersion with isocyanates hydrophilicized by means of cationic, anionic or nonionic structures.

EP-A 0 576 952 relates to water-soluble or water-dispersible mixtures of blocked isocyanates which are obtained by reacting diisocyanates, a monofunctional blocking agent for isocyanates, a hydroxycarboxylic acid, a polyol component comprising a dihydric to hexahydric alcohol having a molar mass of from 62 to 182 g/mol, and a polyester diol component having a molar mass of from 350 to 950 g/mol.

EP-A 0 012 348 relates to a process for preparing water-dispersible or water-soluble blocked polyisocyanates, in which an at least half-blocked polyfunctional isocyanate is reacted with an amine sulfonate or with the corresponding acid.

EP-A 0 566 953 relates to water-soluble or water-dispersible blocked polyisocyanates which may be prepared from an isocyanate mixture having an average isocyanate functionality of from 2.5 to 3.5, a blocking agent, and an aliphatic monohydroxycarboxylic acid.

DE-A 44 13 059 relates to water-soluble blocked polyisocyanates containing incorporated amino groups which can be converted into ammonium salt groups by neutralization with acids and which thus render the crosslinking agent hydrophilic.

EP-A 0 486 881 relates to a water-dilutable polyfunctional polyisocyanate containing free isocyanate groups. The presence of these groups reduces the storage stability of those coating compositions which comprise these crosslinking agents.

The hydrophilically modified (i.e., water-soluble or water-dispersible) blocked isocyanates C2 are obtained by reacting partly blocked polyfunctional isocyanates with hydrophilicizing compounds until all, or virtually all, of the isocyanate groups have been consumed. These hydrophilicizing compounds are selected from anionogenic compounds such as organic carboxylic, sulfonic or phosphonic acids containing at least one isocyanate-reactive group, selected preferably from hydroxyl, amino, hydrazine and mercapto groups, especially bishydroxyalkylcarboxylic acids such as dimethylolpropionic acid, the reaction products thereof with isocyanates can be converted into the corresponding anions by addition of alkali, and also from cationogenic compounds, especially organic amines containing at least one tertiary amino group and at least one of the abovementioned isocyanate-reactive groups, where the tertiary amino group can be converted into the corresponding ammonium cation by adding acids, following the reaction with the isocyanate. The third possibility for hydrophilicization is the reaction of the partly blocked isocyanates with nonionic hydrophilic compounds, especially those having a sufficient fraction of oxyethylene groups, which as is known may also be present together with oxypropylene groups in the compound in question.

As an additional, further curing component a water-dilutable amino resin C3 may be used in a mass fraction of up to 20%, preferably from 2 to 15%, in particular 4 to 10%, based on the mass of the overall curing component. The amount of the amino resin C3 and of the hydrophilic blocked isocyanate C2 must be such that the sum of the mass fractions of all water-dilutable curing components does not exceed 50%.

The amino resin C3 is used preferably in partly (i.e., at least 5% of the methylol groups are etherified) or fully etherified form. Particularly suitable are melamine resins such as hexamethoxymethylmelamine, types. etherified with aliphatic alcohols having from 1 to 6 carbon atoms, such as butanol or mixtures of butanol and methanol, and also the corresponding benzoguanamine, caprinoguanamine or acetoguanamine resins.

The resins A are prepared from the polyhydroxy components A1 and the polycarboxyl components A2 under condensation conditions, i.e., at a temperature of from 80 to 180° C., preferably between 90 and 170° C., preferably in the presence of solvents which form azeotropes with the water formed during the condensation. The temperature is chosen in particular so that it is from about 10 to 20° C. above the elimination temperature of the isocyanate blocking agent. The condensation is continued until the resins A have acid numbers of from about 25 to about 75 mg/g, at which point the Staudinger Index is from about 13.5 to 18 $cm^3/g$, preferably from 14.5 to 16.5 $cm^3/g$, in each case measured in dimethylformamide as solvent at 20° C. Following at least partial neutralization of the remaining carboxyl groups (with preferably from 10 to 80% of the carboxyl groups, with particular preference from 25 to 70%, being neutralized), the resins A are dispersible in water. During the condensation it may be observed that the initially cloudy reaction mass clarifies and forms a homogenous phase.

The curing agent is added to the resin A preferably prior to the neutralization and dispersing.

The ready-formulated dispersion may be adapted to the intended application by means of customary additives such as pigments, corrosion inhibitors, levelling agents, antisettling agents, adhesion promoters and defoamers.

For the formulation of surfacers, organic or inorganic fillers as well are added to the dispersion, such as carbon black, titanium dioxide, finely divided silica, silicates such as kaolin or talc, chalks, heavy spar (barium sulfate) or iron oxide pigments; organic fillers which may be used are ground thermoplastics such as polyolefins, polyesters or polyamides; preference is also given to polymers of olefinically unsaturated monomers that are obtainable by emulsion polymerization, including crosslinked polymers in particular.

The surfacer compositions may further comprise the customary solvents, especially water-miscible solvents. These surfacers are normally prepared by grinding the fillers and pigments with a portion of the dispersion and with the addition of dispersing auxiliaries, defoamers and other additives in appropriate dispersing equipment such as a bead mill. The particle size of the fillers and pigments is preferably reduced to less than 15 $\mu$m. The remainder of the dispersion and any further additives are added to this preparation in accordance with the target pigment/binder mass ratio of from 0.5:1 to 2.5:1. The mass of the pigments here also includes the mass of the fillers.

The finished formulation may be applied to the substrate by the customary techniques, such as by roller, by spraying or by roll coating. Particular preference is given to spraying application techniques, such as compressed air spraying, airless spraying or what is known as "ESTA high-speed rotation spraying". After a short flash-off time at room temperature or elevated temperature of up to about 80° C., the film is baked at from about 130 to about 190° C. The film thickness after baking is usually from about 15 to about 120 μm, preferably between 25 and 70 μm.

The combination of water-insoluble and hydrophilic curing components as described herein brings about a markedly improved gloss of the baked film. Despite the fact that in the automotive coating system the surfacer film is coated with at least one further film (solid-color topcoat) or two further films (in the case of metallic paint: pigmented paint film containing color pigment and metallic effect pigment, and a clearcoat film), the markedly improved gloss of the surfacer film also has a substantial influence on the appearance of the finished coating system. The resistance to stone chipping is likewise unexpectedly improved.

The invention will be further illustrated by the following examples which are not intended to limit the scope of the invention as noted.

EXAMPLES

1 Preparing the Water-insoluble Curing Agent A (UH)

105 g of methyl ethyl ketoxime and 0.1 g of dibutyltin dilaurate were heated to 80° C., with inert gas being supplied to the system, and were admixed in portions with 255 g of ®Desmodur N 3390 (aliphatic isocyanate based on 1,6-hexamethylene diisocyanate). The reaction was exothermic and was continued until all of the isocyanate groups had reacted. The clear solution had a mass fraction of solids of about 93%, the viscosity (58 g of the curing agent in 100 g of solution in butyl glycol at 23° C., measured in accordance with DIN EN ISO 3219) was about 400 mPa·s.

2 Preparing the PH Component B (PHES1)

79 g of dipropylene glycol, 87 g of hexanediol, 90 g of trimellitic anhydride and 0.2 g of dibutyltin dilaurate were esterified at 180° C. to an acid number of approximately 20 mg/g. At the end of the reaction, the viscosity (measured in accordance with DIN EN ISO 3219 at 23° C. on a solution of 55 g of resin in 100 g of solution in butyl glycol) was 500 mPa·s.

3 Preparing the PC Component C (PCPU)

270 g of dimethylolpropionic acid, 134 g of dipropylene glycol, 180 g of ethyl glycol, 367 g of diglycol dimethyl ether and 183 g of methyl isobutyl ketone were weighed out into a reaction vessel with stirring, cooling and heating equipment and were heated to 100° C. At 100° C., 696 g of tolylene diisocyanate were added dropwise, account being taken of the exothermic reaction, and the temperature was maintained until the mass fraction of free isocyanate groups had fallen to below 0.1%. The batch was subsequently diluted with 260 g of diglycol dimethyl ether and 130 g of methyl isobutyl ketone. This gave a clear resin solution having a viscosity of 200 mPa·s (measured at 23° C. in accordance with DIN EN ISO 3219 on a solution of 46 g of resin in 100 g of solution in diglycol dimethyl ether), a mass fraction of solids of approximately 60% and an acid number of 95 mg/g.

4 Preparing the Carboxyl Component D (PCLM)

300 g of linseed oil were mixed with 100 g of maleic anhydride under a nitrogen atmosphere and the mixture was heated to 200° C. over 4 hours. The temperature of 200° C. was maintained until free maleic anhydride could no longer be detected. After cooling to 85° C., the batch was admixed with a mixture of 30 g of fully deionized (DI) water and 3 g of triethylamine and held at the temperature until an acid number of 200 mg/g was reached. Subsequently, it was diluted with 85 g of methoxypropoxypropanol. The resulting resin solution had a mass fraction of solids of approximately 80%.

5 Preparing the PH Component E (PHES2)

In an appropriate reaction vessel, 183 g of dipropylene glycol, 35 g of isononanoic acid, 68.5 g of pentaerythritol, 175 g of isophthalic acid and 0.5 g of dibutyltin dilaurate were esterified at 220° C. to an acid number of less than 5 mg/g. At 70° C., the batch was diluted with methyl ethyl ketone to 65%, and 60 g of tolylene diisocyanate were added. The temperature was held until free NCO groups were no longer detectable.

6 Preparing the Binder 1

75 g of component B (PHES1) and 25 g of component C (PCPU) were mixed and heated to 150° C. The solvent present was substantially removed, by distillation under reduced pressure. The temperature of 150° C. was held until an acid number of from 35 to 40 mg/g and a viscosity of 600 mPa·s (measured in accordance with DIN EN ISO 3219 at 23° C. on a solution of 45 g of resin in 100 g of solution in butyl glycol) was reached. After cooling to 100° C., the batch was mixed with 25 g of component A (water-insoluble curing agent) The batch was subsequently neutralized with dimethylethanolamine and diluted using DI water to a mass fraction of solids of 35%.

7 Preparing the Binder 2

70 g of component E (PHES2) and 30 g of component D (PCLM) were mixed. The mixture was condensed at a reaction temperature of 100° C. until an acid number of from 65 to 70 mg/g was reached; the viscosity (measured on a solution of 40 g of resin in 100 g of solution in butyl glycol in accordance with DIN EN ISO 3219 at 23° C.) was 450 mPa·s. 33 g of component A (water-insoluble curing agent) were subsequently added. After homogenization had been carried out, the mixture was neutralized with dimethylethanolamine and adjusted with DI water to a mass fraction of solids of 40%.

Testing of the Binders of the Invention as Automotive Surfacers

The binders corresponding to examples 1 to 2 were formulated as automotive surfacers. The composition is given in table 1 below:

TABLE 1

(mass of constituents in g)

| | Surfacer 1 | Surfacer 2 |
|---|---|---|
| BM 1 as per example 6 | 242.9 | — |
| BM 2 as per example 7 | — | 200 |
| Hydrophilically mod. blocked isocyanate* | 16.7 | 33.3 |
| Water-dilutable amino resin+ | 5.3 | — |
| Titanium dioxide (rutile) | 50 | 50 |
| Barium sulfate | 40 | 40 |
| Micronized talc | 10 | 10 |
| Carbon black pigment | 0.2 | 0.2 |
| Deionized water | 35 | 67 |

*hydrophilic aliphatic polyisocyanate based on hexamethylene diisocyanate (®Bayhydur 3100), diluted with DI water to a mass fraction of solids of 60%
+melamine resin partly etherified with methanol and having a degree of polymerization of about 2.3, aqueous solution with a mass fraction of solids of 95%

The coating materials had a mass fraction of solids of about 50%, a pH of about 8.0 (adjusted using dimethylethanolamine) and a viscosity of about 120 mPa·s at 20° C. The surfacers were applied using a compressed air gun to a zinc-phosphatized steel panel coated with a cathodic electrodeposition primer (about 20 μm). The surfacers were cured in a forced air oven for 20 minutes at 130° C. or 150° C. or 190° C. In all cases, a dry film thickness of 35±2 μm was obtained. Over the surfacer coat there was applied a commercially customary alkyd resin automotive topcoat which was cured at 135° C. for 30 minutes (dry film 35±2 μm). The resistance properties of the films (solvent and water resistance) and also the mechanical values met in-service requirements in the case of all of the coatings. The stone-chip resistance was tested using the stone-chip testing instrument in accordance with the VDA (German Automakers' Association) (from Erichsen, Model 508) at +20° C. using 1 kg of steel shot (angular, 4 to 5 mm average diameter, blasted using compressed air at 0.3 MPa (3 bar)). The topcoat adhesion (0=no flaking of the topcoat from filler, 10=no adhesion between topcoat and filler) and the number of strikethroughs (0=no strikethrough, 10 =very large number of strikethroughs) were evaluated in the standard way. Testing was also carried out using the stone-chip simulation instrument "SPLITT" (=Single Projectile Launching Impact Tester). The latter method is described in detail in the journal Farbe und Lack, No. 8, pages 646 to 653 (1984). In this case the baking temperature for the surfacer was 160° C., the impact angle 5° and the ball diameter 2 mm with a mass of 0.5 g. The chosen impact speed was 180 km/h. The test specimens were tested at +20° C. and at −20 C. Table 2 indicates the (substantially circular) damage area in mm$^2$ and the coat exposed at the damage site (metal panel—B, primer—G, surfacer—F).

In order to determine the gloss, the coating materials as per table 1 were drawn down onto a glass plate using a drawing cube (gap width 150 μm) and after flashing off at room temperature (10 minutes) were cured in a forced air oven at 170° C. The gloss of these plates was determined in accordance with DIN 67 530 at an angle of 20°.

The results of testing are summarized in table 2 below.

TABLE 2

| Automotive surfacer based on binders | BM1 | BM2 | Comparison: Ex. 4 from EP-B 0 594 685 | Comparison: Ex. 2 from EP-B 0 548 873 |
|---|---|---|---|---|
| VDA stone-chip test | | | | |
| Topcoat adhesion | 2 | 1 | 3 | 2 to 3 |
| Strike-throughs | 2 | 2 | 3 | 2 to 3 |
| "SPLITT" at +20° C. | 3 to 4/G/F | 3 to 4/G | 10/B/G | 6/G/F |
| "SPLITT" at −20° C. | 4 to 6/B/G | 2 to 4/G | 12/B/G | 6/G/F |
| Gloss in % | 56 | 60 | 55 | 50 |

It is evident that in both different tests the stone-chip resistance of the surfacers of the invention is markedly better than that of the comparative surfacers. The gloss is also considerably greater in the case of the surfacer of the invention. This improvement is also manifested through the overlying topcoat.

What is claimed is:

1. A coating composition comprising a condensation product A of a carboxyl group-containing resin A1 having a Staudinger Index, measured in dimethyl formamide as a solvent, of from 4.0 to 12 cm$^3$/g, and a hydroxyl group-containing resin A2 having a Staudinger Index, measured in dimethyl formamide as a solvent, of from 8 to 13 cm$^3$/g, and a curing agent C which becomes active only at elevated temperature of at least 80° C., wherein said curing agent comprises a mixture of mass fractions of from 95 to 20% of a water-insoluble blocked polyfunctional isocyanate C1 and from 5 to 80% of a hydrophilic blocked isocyanate C2.

2. The coating composition as claimed in claim 1, wherein the component A has an acid number of from 25 to 75 mg/g.

3. The coating composition as claimed in claim 1, wherein the component A1 has an acid number of from 100 to 230 mg/g.

4. The coating composition as claimed in claim 1, wherein the component A2 has a hydroxyl number of from 50 to 500 mg/g.

5. The coating composition as claimed in claim 1, wherein the curing agent C is a mixture of mass fractions of from 25 to 90% of a water-insoluble blocked polyfunctional isocyanate C1 and from 10 to 75% of a hydrophilic blocked isocyanate C2.

6. The coating composition as claimed in claim 1, wherein the curing agent C further comprises a mass fraction of up to 20% of a water-dilutable amino resin C3, and the mass fraction of water-soluble or water-dilutable curing agents C2 and C3 together is less than 50% of the sum of the masses of all curing agents C1, C2 and C3.

7. The coating composition as claimed in claim 6, wherein the curing agent C comprises a mass fraction of from 2 to less than 15% of a water-dilutable amino resin C3 and a mass fraction of over 35 to 48% of a hydrophilic blocked isocyanate C2.

8. The coating composition as claimed in claim 1, wherein from 60 to 95% of the carboxyl groups of the resins A have been neutralized.

9. A process for preparing a coating composition as claimed in claim 1, which comprises preparing from the carboxyl group-containing resins A1 and from the hydroxyl group-containing resins A2, and the polycondensation conditions, a resin A whose remaining carboxyl groups are neutralized to the extent of from 60 to 95%, dispersing the neutralized resin A in water, and mixing the aqueous dispersion with the curing agent C prior to application.

10. A method of use of a coating composition as claimed in claim 1 wherein the said coating composition is applied to metallic substrates to produce surfacer films thereon.

* * * * *